United States Patent [19]
Mannonen

[11] 3,859,538
[45] Jan. 7, 1975

[54] FAULT DETECTOR FOR PAPER WEBS

[75] Inventor: Pentti Mannonen, Myyrmaki, Finland

[73] Assignee: Oy Stromberg AB

[22] Filed: Oct. 30, 1973

[21] Appl. No.: 411,146

Related U.S. Application Data
[62] Division of Ser. No. 355,704, April 30, 1973.

[30] Foreign Application Priority Data
Nov. 22, 1972 Finland................ 3287/72

[52] U.S. Cl................... 250/572, 250/338, 356/200
[51] Int. Cl. .......................................... G01n 21/20
[58] Field of Search .......... 250/562, 208, 209, 214, 250/206, 572; 307/311; 356/200, 238, 239

[56] References Cited
UNITED STATES PATENTS

| | | | |
|---|---|---|---|
| 3,397,317 | 8/1968 | Dosch | 250/562 |
| 3,418,482 | 12/1968 | Masson | 250/572 |
| 3,454,160 | 7/1969 | Schäfer | 250/562 |
| 3,506,838 | 4/1970 | Offutt | 250/562 |
| 3,535,532 | 10/1970 | Merryman | 250/217 SS |
| 3,589,816 | 6/1971 | Sugaya | 356/238 |
| 3,628,030 | 12/1971 | Fertig | 250/572 |
| 3,638,050 | 1/1972 | Harp | 250/206 |
| 3,741,663 | 6/1973 | Nevins | 250/572 |

Primary Examiner—James W. Lawrence
Assistant Examiner—D. C. Nelms
Attorney, Agent, or Firm—Staas & Halsey

[57] ABSTRACT

The invention relates to an amplification circuit for a photoelectric device — for example, a phototransistor — whereby the output from such circuit is responsive to percentage changes in the light incident upon said device rather than absolute changes therein or in the condition of the circuit. The device is connected in series with a diode junction across a potential supply and the current passing therethrough controls the bias applied to a transistor connected across a potential supply and having diode junction characteristics similar to those of the first-named junction. The output signal from the circuit is thus dependent upon the current flow through the transistor, which is controlled by the bias applied thereto. Also disclosed and claimed is the application of the circuit to a web fault detector apparatus.

13 Claims, 5 Drawing Figures

FAULT DETECTOR FOR PAPER WEBS

This is a division of application Ser. No. 355,704, filed Apr. 30, 1973.

The present invention relates to an amplification circuit for a photoelectric device.

A photoelectric device is one wherein the conductive or resistive properties thereof vary with the intensity of light falling thereupon. A typical field of use for such devices is in the detection of faults in webs of paper and like material, whereby the web is passed between a light source directed at the photoelectric device and faults in the web, such as spots or holes, cause fluctuations in the intensity of the light falling upon the photoelectric device. Generally, the device is placed in circuit with amplification means whereby an amplified signal, dependent upon the fluctuations of the light falling upon the photoelectric device, is obtained. Such systems generally have the disadvantage that the output signal is proportional to absolute changes in the light intensity incident upon the photoelectric device. Therefore, the functioning of the system is affected by dust present in the path of the light, by ambient temperature changes which affect the sensitivity of the device, by aging of the various components in the system, by changes in the weight of the web material, and so forth.

The purpose of the present invention is to overcome the aforementioned disadvantages by providing an amplification circuit for a photoelectric device — particularly a phototransistor — wherein the output pulses from the circuit are dependent upon the percentage change in light intensity incident upon the device, rather than the absolute change. Thus, relatively slow variations in the operating conditions of the system, such as discussed above, will not give rise to errors in the system, but variations caused by faults in the web material will give rise to valid output signals from the circuit.

Thus, according to the present invention there is provided an amplification circuit for a photoelectric device, said circuit comprising a transistor connected across first and second terminal means adapted for connection across a first d.c. potential supply source, said transistor having a control electrode and further having first and second current-passing electrodes connected via connection means to said first and second terminal means respectively, a load means comprising a diode junction connected in series with said photoelectric device across third and fourth terminal means adapted for connection across a second d.c. potential supply source, said photoelectric device connected to said third terminal means and said load means connected to said fourth terminal means, means connecting said control electrode of said transistor to the junction between said load means and said photoelectric device, and output terminal means connected to said first current-passing electrode of said transistor for deriving an output potential therefrom, said transistor having diode junction characteristics similar to those of the first-named said diode junction.

As stated above, while the circuit of the present invention is by no means restricted to the field of web fault detection systems, it is particularly suited for applicability to such systems. Therefore, according to a further aspect of the invention there is provided a fault detection apparatus for a web of paper or like material, comprising a light source and an array of photoelectric devices spaced therefrom and aligned therewith for receiving light emitted thereby, said photoelectric devices responsive to rapid fluctuations in the light transmitted by said web passing between said photoelectric device and said light source, each said photoelectric device having associated therewith an amplification circuit comprising a diode junction series connected with said photoelectric device between terminal means adapted for connection across a first d.c. potential supply source and an amplification transistor connected between terminal means adapted for connection across a second d.c. potential supply source, said amplification transistor having a control electrode and further having diode junction characteristics similar to those of the first-named said diode junction, and means connecting said control electrode to the junction of said photoelectric device and the first-named said diode junction.

The invention will now be described further by way of example only and with reference to the accompanying drawings, wherein.

Figure 1:
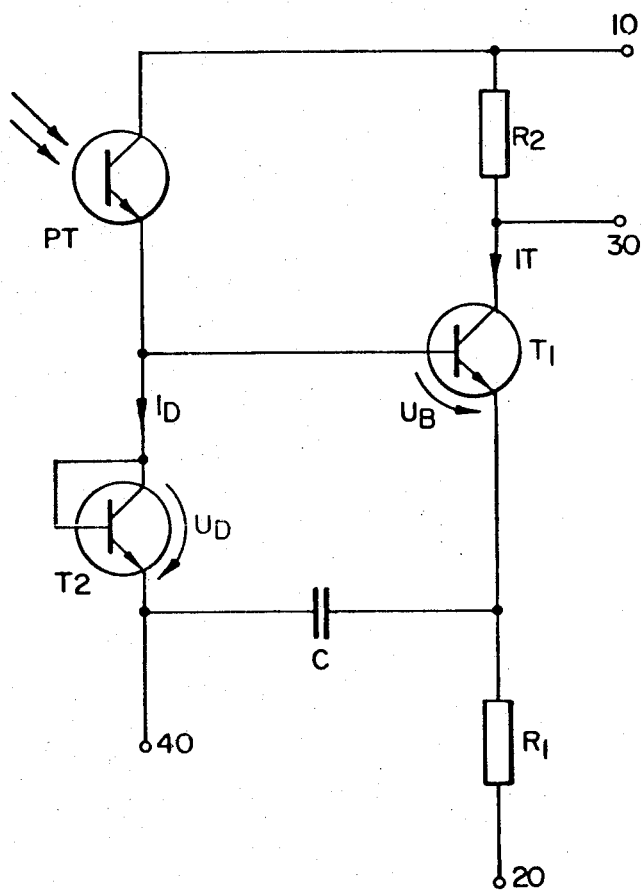
FIG. 1 is a schematic diagram of an amplification circuit according to one embodiment of the present invention, including a photoelectric device.

Referring now to the drawings, and particularly to FIG. 1 thereof, a photoelectric device in the form of a phototransistor PT is connected in series with a transistor T2 between terminals 10 and 40. The emitter electrode of transistor PT is connected to the collector electrode of transistor T2, the collector and base electrodes of T2 being interconnected. The emitter electrode of T2 is connected to terminal 40 and the collector electrode of phototransistor PT is connected to terminal 10. A second transistor T1, having similar electrical characteristics to transistor T2, is connected via a resistor R2 to terminal 10, and via a resistor R1 to a terminal 20. The emitter electrode of T1 is connected to resistor R1, the collector electrode of T1 is connected to resistor R2 and the base electrode of T1 is connected to the junction between the emitter electrode of phototransistor PT and the collector electrode of transistor T2. A capacitance means C is connected between the emitter electrodes of transistors T1 and T2. Terminals 10 and 20 are respectively adapted for connection to the positive side $+U_b$ and the negative side $-U_b$ of a d.c. potential supply source.

Terminal 40 is adapted for connection to a reference ground potential point, with respect to which the terminals 10 and 20 are respectively of positive and negative polarities. Preferably, the reference ground potential point lies midway between the potentials of the terminals 10 and 20. An output signal from the circuit is derived through a terminal 30, connected to the collector electrode of transistor T1.

The principle of operation of the circuit of FIG. 1 is best described by reference to the following equations, by which the output voltage from circuit caused by a change in the light intensity impinging upon phototransistor PT, may be calculated.

From a consideration of the circuit of FIG. 1, the following equations may be written.

Wherein:

$$U_{D1} \approx U_{oD} \ln (I_{D1}/I_{oD}) \quad (1)$$
$$U_{D2} \approx U_{oD} \ln (I_{D2}/I_{oD}) \quad (2)$$
$$I_{T1} \approx I_{oT} \exp (U_{B1}/U_{oT}) \quad (3)$$
$$I_{T2} \approx I_{oT} \exp (U_{B2}/U_{oT}) \quad (4)$$

Wherein:

$U_D$ is the emitter/collector voltage of transistor $T_2$;

$I_D$ is the collector current of transistor $T_2$;

$U_{oD}$ and $I_{oD}$ are respectively voltage and current characteristic constants for transistor $T_2$;

$U_B$ is the emitter/base voltage of transistor $T_1$;

$I_T$ is the collector current of transistor $T_1$;

$U_{oT}$ and $I_{oT}$ are respectively voltage and current characteristic constants for transistor $T_1$; and the subscripts 1 and 2 denote the aforementioned parameters before and after the light incidence fluctuation, respectively.

Equations (1) and (2) may be combined to give:

$$U_{D2} - U_{D1} = U_{oD} (\ln [I_{D2}/I_{oD}] - \ln [I_{D1}/I_{oD}]) = U_{oD} \ln (I_{D2}/I_{D1}) \quad (5)$$

Equations (3) and (4) may be combined to give:

$$I_{T2}/I_{T1} = \exp (U_{B2} - U_{B1})/U_{oT} \quad (6)$$

Immediately after the fluctuation of light incidence, it will be realized that:

$$U_{D2} - U_{D1} = U_{B2} - U_{B1} \quad (7)$$

Equations (5) to (7) inclusive may now be combined to show that:

$$I_{T2}/I_{T1} = \exp ([U_{oD}/U_{oT}] \ln [I_{D2}/I_{D1}]) = (I_{D2}/I_{D1})^{U_{oD}/U_{oT}} \quad (8)$$

If transistors $T_1$ and $T_2$ have identical characteristics, then clearly:

$$U_{oD} = U_{oT} \quad (9)$$

whereby:

$$I_{T2}/I_{T1} = I_{D2}/I_{D1} \quad (10)$$

The change in output voltage $dU$ from the terminal 30 caused by the light fluctuation is given by:

$$dU = (I_{T2} - I_{T1}) \quad (11)$$

Also, it will be realised from a consideration of FIG. 1 that:

$$I_{T1} = U_B/R_2 \quad (12)$$

Combining equations (10) to (12) inclusive, the equation for $dU$ is derived:

$$dU = U_B (R_1/R_2) \cdot (T_{D2} - I_{D1})/I_{D1} \quad (13)$$

Therefore, it will be seen that, $U_B$, $R_1$ and $R_2$ being constant, the output pulse $dU$ from the terminal 30 is proportional to the percentage current charge through the phototransistor PT rather than being proportional to an absolute change.

Thus, when the phototransistor is connected in series with a diode junction, such as the emitter-base junction of transistor T2, having junction characteristics which substantially conform to those of the transistor T1, the output voltage pulse amplitude of the terminal 30 is linearly proportional to the percentage change of the light intensity falling upon the phototransistor T1. Clearly, in practice, the simplest way to ensure conformity between transistors T1 and T2 is to choose these transistors to be of the same type.

It has been found that using the circuit shown in FIG. 1, the incident light or operating characteristics of the circuit may change slowly in magnitude by an order of up to 1,000 times, without causing output pulses from the circuit which would give rise to errors in the system.

Figure 2:
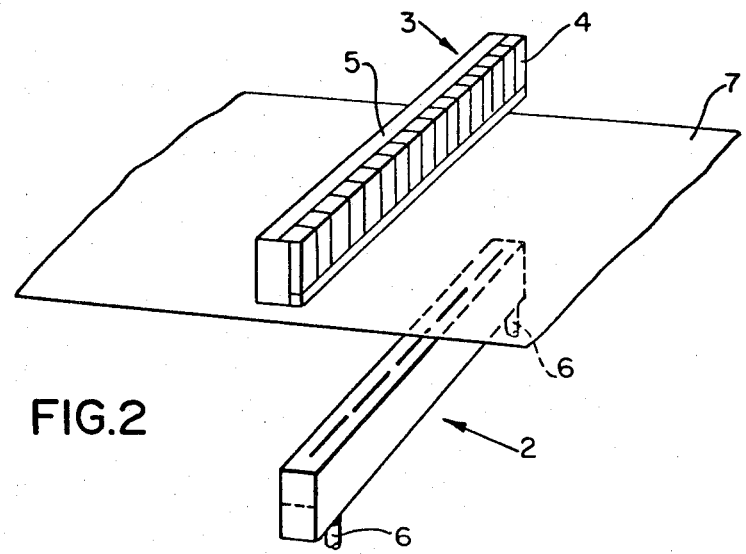
FIG. 2 is a perspective view of fault detection apparatus according to one embodiment of the present invention.

Turning now to FIG. 2, there is shown a web of paper or like material 1, passing between a light source array 2 and a corresponding array of photoelectric devices 3. The arrays 2 and 3 extend transversely of the web 1 and over substantially the entire width thereof. The photoelectric devices — each of which, in practice, is the phototransistor PT of FIG. 1 — are contained within units 4, which provide housings for the devices and which are detachably mounted in side-by-side relationship upon a frame 5.

The array 2 is preferably formed from a series of elongated infra-red lamps 2', which are mounted to form a continuous row, and which is cooled by means of an air flow introduced into and expelled from the ends of the array through tubes 6.

Figures 3A, 3B:
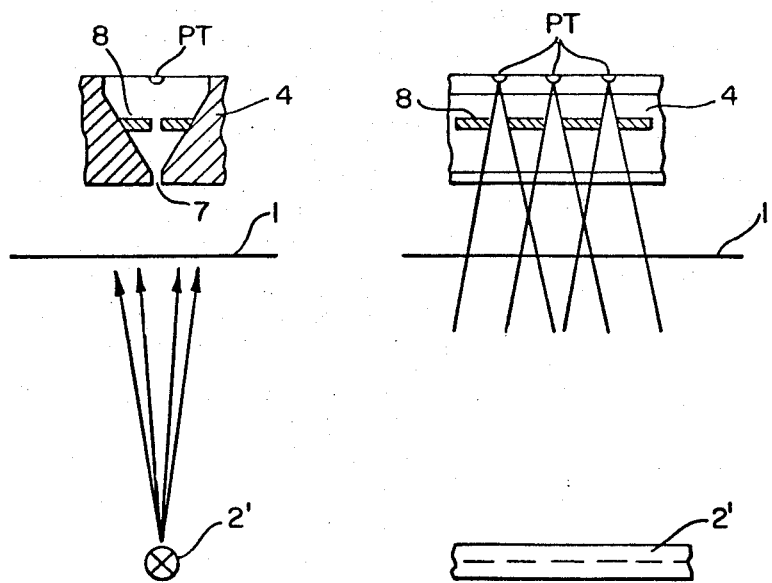
FIGS. 3a and 3b are sectional views showing details of the apparatus shown in FIG. 1.

FIGS. 3a and 3b show, beneath the web 1, an elongated infra-red lamp 2', which forms one lamp of the array 2. Thus, the array of such lamps illuminates the entire width of the adjacent surface of the web passing thereover. The detector units 4 above the web are each provided with a narrow slit 7 disposed transversely of the web, through whichh the phototransistors PT receive light from the lamps 2' passing through the web 1. The slit has the effect of ensuring that the phototransistors PT monitor a narrow transverse strip of the web 1 as it passes between the arrays 2 and 3. In practice, the slits are preferably open-ended so that a continuous slit is formed over the length of the array 3, when the units 4 are in place as shown in the drawings. The area monitored by each individual phototransistor device T1 may be adjusted by means of stops 8, the length and spacing of which may be chosen in dependence on the width of each detector unit 4 and the properties of the phototransistors contained therein. Also, the resolution in the direction of the slits and the sensitivity of the system may be determined by appropriately spacing the individual phototransistors in the units 4, such resolution and sensitivity depending to a large extent upon the type of web material being tested. Typically, the detector units 4 may each be constructed to be from 10 to 50 cm. in length and each contain ten phototransistors and associated amplification circuits. By constructing the units to be relatively narrow — say, only 10 cm. — the phototransistors therein are, of course, closely spaced, thus giving high sensitivity and resolution.

Figure 4:
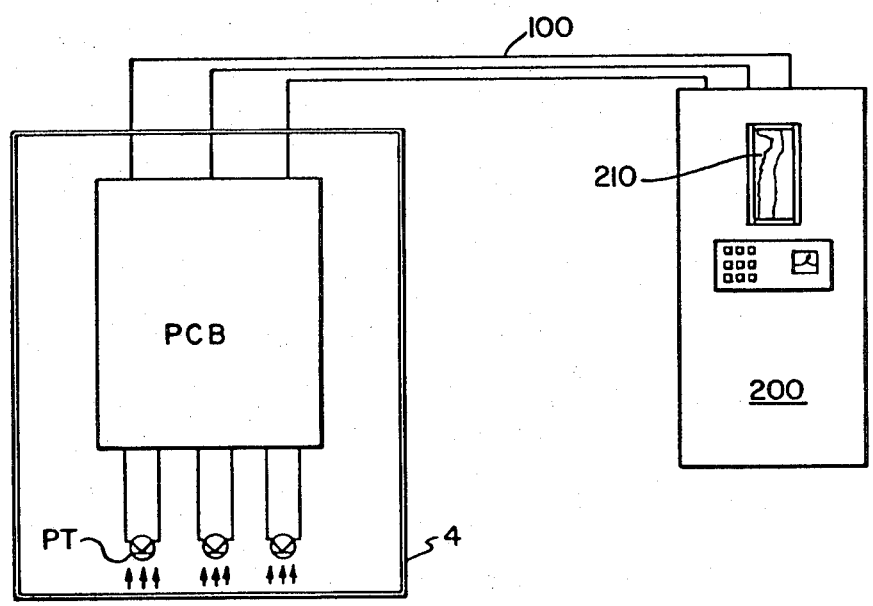
FIG. 4 is a schematic diagram of a portion of the apparatus of FIG. 2, connected to a signal processing and display apparatus.

Turning now to FIG. 4, there is shown in schematic form, a unit 4, having a plurality of phototransistors PT. For the purposes of illustration and clarification, only three phototransistors are present in the examples of FIG. 4. Each phototransistor is connected to a printed circuit board PCB upon which is provided the amplification circuits for the respective phototransistors. The outputs from the board PCB are fed into a signal processing and display console 200, wherein the inputs from the individual phototransistors are processed and displayed, for example upon a chart recorder 210. Alternatively, and more preferably, the individual outputs from the amplification circuits of each unit 4 may be summed and fed to the console 200, whereby one input for each unit is fed into the console. Thus, all the amplification circuits of each detector unit 4 have a common input to the console 200 and the signals entered therein are processed and displayed. By this means, any fault may be localized within the width of each unit in the direction transverse to the direction of travel of the web containing such fault. The faults so detected may then by electronically classified by groups, according to the polarities, amplitudes and duration of the amplification circuit output pulse derived from the individual units. As mentioned above, the processed signals may then be displayed on a chart recorder or they may be fed to a computer or alarm system.

A further feature which will be apparent from FIG. 4 is that, within the limits of the size of the boards PCB and the constraints imposed by the number of amplification circuits upon each such board, a standard board may be utilized for various sizes of unit 4.

Thus, the present invention provides an amplification circuit for a photoelectric device, which does not depend upon absolute changes in the light intensity incident upon the device but only upon percentage changes therein. Thus the system is relatively unaffected by dust, aging of the components and ambient temperature changes. It may be noted that in the embodiment shown in FIG. 3a of the drawings, it is particularly simple to minimize the effects of dust by arranging for air flow along the slit 7, which is where the dust would normally tend to accumulate.

Furthermore, the web fault detection system according to the invention and using the amplification circuit described and claimed is simple and inexpensive to construct and reliable in operation. The system further has the advantage that it is selective in directions transverse to the direction of passage of the web and such selectivity may readily be chosen to be consistent with individual requirements of different webs.

Various further embodiments of the invention will be apparent to those skilled in the art from the foregoing description without departing from the spirit and scope of the invention as defined by the appended claims.

I claim:

1. Fault detector apparatus for a web of paper or like material, comprising a light source consisting of a plurality of light-emitting devices and an array of photoelectric devices spaced therefrom and aligned therewith for receiving light emitted thereby, said photoelectric devices responsive to rapid fluctuations in the light transmitted by said web passing between said photoelectric devices and said light source, each said photoelectric device having associated therewith an amplification circuit comprising a diode junction series connected with said photoelectric device between terminal means adapted for connection across a first d.c. potential supply source and an amplification transistor connected between terminal means adapted for connection across a second d.c. potential supply source, said amplification transistor having a control electrode and further having diode junction characteristics substantially the same as those of the first-named said diode junction, and means connecting said control electrode to the junction of said photoelectric device and the first named said diode junction.

2. Fault detector apparatus for a web of plastic or like material, comprising a light source consisting of a plurality of light-emitting devices and an array of photoelectric devices spaced therefrom and aligned therewith for receiving light emitted thereby, said photoelectric devices responsive to rapid fluctuations in the light transmitted by said web passing between said photoelectric devices and said light source, each said photoelectric device having associated therewith an amplification circuit comprising:

a transistor connected across first and second terminal means adapted for connection across a first d.c. potential supply source, said transistor having a control electrode and further having first and second current-passing electrodes connected via connection means to said first and second terminal means respectively;

a first load means comprising a diode junction;

said load means connected in series with said photoelectric device across third and fourth terminal means adapted for connection across a second d.c. potential supply source;

said photoelectric device connected to said third terminal means and said first load means connected to said fourth terminal means;

means connecting said control electrode of said transistor to the junction between said load means and said photoelectric device;

output terminal means connected to said first current-passing electrode of said transistor for deriving an output potential therefrom, said transistor having diode junction characteristics substantially the same as those of the first-named said diode juenction;

second load means connected between said first current-passing electrode of said transistor and said first terminal means;

third load means connected between said current-passing electrode of said transistor and said second terminal means; and capacitance means interconnecting said second current-passing electrode of said transistor and said fourth terminal means.

3. The fault detector apparatus of claim 2, wherein said light-emitting devices are infra-red lamps.

4. The fault detector apparatus of claim 2, wherein said photoelectric devices are arranged in a substantially linear array.

5. The fault detector apparatus of claim 4, wherein said photoelectric devices are grouped in units, the sensitivity of said apparatus being proportional to the number and spacing between said devices in each said unit and the length of each said unit in the direction of said array.

6. The fault detector apparatus of claim 5, wherein each said unit includes a circuit board having mounted thereon the amplification circuits for the photoelectric devices in the said unit associated therewith, said circuit board of each said unit being of substantially the same configuration and construction as corresponding circuit boards of the remaining said units.

7. The fault detector apparatus of claim 2, wherein said photoelectric devices are grouped into symmetrical elongated units, said photoelectric devices in each unit forming a substantially linear array and said units arranged end-to-end, each said unit containing a circuit board for said amplification circuits and each said circuit board being of similar configuration and construction to the remaining said circuit boards, the resolution of said apparatus in the direction of said array being proportional to the spacing of the photoelectric devices and the length of each said unit in the direction of said array.

8. The fault detector apparatus of claim 2, wherein said photoelectric devices are grouped in a series of units, the totality of said photoelectric devices forming a substantially straight line, each said unit having a slitted member positioned with the slit thereof in the path of light rays from said light source and incident upon said photoelectric devices.

9. The fault detector apparatus of claim 8, wherein the slitted members of said units define in combination, a continuous slit, extending over substantially the entire length of said array.

10. The fault detector apparatus of claim 2, wherein said photoelectric devices are grouped into a plurality of elongated units, said photoelectric devices in each said unit forming a substantially linear array, and stop means provided in the path of light from said light source and incident upon said photoelectric devices for defining the area of web material monitored by the devices in said unit.

11. The fault detector apparatus of claim 2, further comprising a signal processing station and means connecting the amplification output circuits of said devices to input means of said station.

12. The fault detector apparatus of claim 5, further comprising a signal processing station and means interconnecting the amplification output circuits of the individual devices in each said unit to give a common output for each unit, and means connecting said common outputs to individual input means of said signal processing station.

13. The fault detector apparatus of claim 2, wherein said photoelectric devices are phototransistors.

* * * * *